United States Patent
Guidotti et al.

(10) Patent No.: US 6,823,098 B2
(45) Date of Patent: Nov. 23, 2004

(54) EVANESCENT WAVE TUNNELING OPTICAL SWITCH AND NETWORK

(75) Inventors: Daniel Guidotti, Yorktown Heights, NY (US); Harold John Hovel, Katonah, NY (US); Maurice McGlashan-Powell, Mt. Vernon, NY (US); Keith Randal Pope, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 10/227,926

(22) Filed: Aug. 26, 2002

(65) Prior Publication Data

US 2004/0037488 A1 Feb. 26, 2004

(51) Int. Cl.[7] .............................. G02B 6/26; G02B 6/42
(52) U.S. Cl. ............................ 385/17; 385/14; 385/30; 385/32
(58) Field of Search ..................... 385/15–18, 25–30, 385/32, 42, 49

(56) References Cited

U.S. PATENT DOCUMENTS

| | | | |
|---|---|---|---|
| 5,568,574 A | 10/1996 | Tanguay ..................... | 385/14 |
| 5,699,462 A | 12/1997 | Fouquet ..................... | 385/18 |
| 5,960,131 A | 9/1999 | Fouquet ..................... | 385/17 |
| 6,055,344 A | 4/2000 | Fouquet ..................... | 385/16 |
| 6,137,927 A | 10/2000 | Keck ......................... | 385/24 |
| 6,625,356 B2 * | 9/2003 | Ticknor et al. ............... | 385/39 |
| 6,658,176 B2 * | 12/2003 | Amantea ..................... | 385/16 |
| 6,665,476 B2 * | 12/2003 | Braun et al. ................. | 385/50 |
| 2003/0108274 A1 * | 6/2003 | Haronian ..................... | 385/17 |

* cited by examiner

*Primary Examiner*—Edward J. Glick
*Assistant Examiner*—Thomas R Artman
(74) *Attorney, Agent, or Firm*—George Sai-Halasz; Robert M. Trepp

(57) ABSTRACT

An optical switch for routing light between two waveguides is disclosed. The switch, or router, comprises a movable waveguide, the movable waveguide having two positions, wherein in a first position the movable waveguide is interposed between the two waveguides and transmits light between the two waveguides by evanescent wave coupling, and in the other position the movable waveguide is retracted from the two waveguides and is not transmitting light between the two waveguides. Means for moving the movable waveguide between the two positions is also disclosed. The optical switches are used in M×N optical routing arrays being capable of directing light from any one of the M input ports to any one of the N output ports with additional ADD/DROP functions.

44 Claims, 12 Drawing Sheets

EVANESCENT WAVE TUNNELING OPTICAL SWITCH AND NETWORK

FIELD OF THE INVENTION

The present invention relates to the field of optical communication and optical data transfer. More specifically, this invention relates to optical switching of guided light waves from a first bank of waveguides that carry incoming optical signals to a second bank of waveguides that carry outgoing optical signals with the ability to DROP some optical data streams and to ADD others to the outgoing multiplexed stream composition.

BACKGROUND OF THE INVENTION

This invention relates to the field of optical communication and optical data transfer. These fields are becoming of ever more importance in our networked world, with needs of ever faster communications.

There are several innovations already in this area. In U.S. Pat. No. 5,699,462 to Fouquet, et al., titled "Total internal reflection optical switches employing thermal activation" incorporated herein by reference, in U.S. Pat. No. 5,960,131 to Fouquet, et al., titled "Switching element having an expanding waveguide core", and in U.S. Pat. No. 6,055,344 to Fouquet, et al., titled "Fabrication of a total internal reflection optical switch with vertical fluid fill-holes" various aspects of the construction and operation of a guided wave, fluid activated, optical switch based on total internal reflection is described. But these patents do not teach the present invention.

An invention relating to the switching of guided light waves from a first bank of waveguides that carry incoming optical signals to a second bank of waveguides, with "on"-"off" switches rather than routers, is reported by Shubin, I. et al, titled "A guided wave optical switch controlled by a micro electro mechanical cantilever" in LEOS 2000. (13th Annual Meeting. IEEE Lasers and Electro Optics Society 2000. Rio Grande, Puerto Rico Nov. 13–16, 2000, Conference Proceedings vol.1, P50-1). But this publication does not teach the present invention.

SUMMARY OF THE INVENTION

The present invention describes an optical switch, or router, which uses evanescent wave tunneling across a variable size physical gap. Electromagnetic wave tunneling becomes very efficient across a narrow tunneling gap discontinuity, while it is negligible for a wide tunneling gap discontinuity. In a medium in which optical losses are negligible, this means that in the case of a narrow gap optical energy is transmitted into the medium adjacent to the gap, while for a wide gap optical energy is reflected back into the incident medium. This is in fact the basis for the optical switch subject of this invention.

To make an evanescent wave tunneling switch practical it is necessary to judiciously add a number of thin films to both sides of the gap on the incident and adjacent media in the path of the propagating electromagnetic wave. The multilayer thin film structure on both sides of the gap constitutes tunneling gap engineering and its purpose is to alter the phase of the propagating light at the gap discontinuity so as to be able to exercise control over the magnitude of the gap for which efficient tunneling or propagation occurs as well as over the magnitude of the gap for which inefficient tunneling or reflection occurs. Tunneling gap engineering is discussed as are a number of means for actuating and controlling the gap width as it is changed from narrow to wide, and vice versa, in order to affect optical switching.

The construction and operation of an M×N optical routing array being capable of directing light from any one of the M input ports to any one of the N output ports with additional ADD/DROP functions, using the invented optical switches, or routers, is also demonstrated. A waveguide crossing means is disclosed for the efficient operation of the optical arrays.

BRIEF DESCRIPTION OF THE DRAWINGS

These and other features of the present invention will become apparent from the accompanying detailed description and drawings.

DETAILED DESCRIPTION OF THE INVENTION

The physical phenomenon of Total Internal Reflection is well know to those skilled in the art of Optics (see, for example, "Principles of Optics", Max Born and Emil Wolf, Pergamon Press, 1964) and will only briefly summarized here. When light is propagating in a non-absorbing first medium with an index of refraction of $n_1$ and is incident on a boundary with a second medium with an index of refraction of $n_2$, and $n_2<n_1$, then if the angle of incidence $\phi i$ is greater than a critical angle $\phi c$, total reflection occurs and all of the incident electromagnetic (EM) energy is reflected back into the first medium. However, while under conditions of total reflection no energy is transferred into the second medium, a non-propagating electromagnetic field does exist in the second medium just beneath the boundary. This field is called the "evanescent field" or "near field" and decays exponentially as distance away from boundary of the first and second medium, with a characteristic decay length of L.

Figure 1:
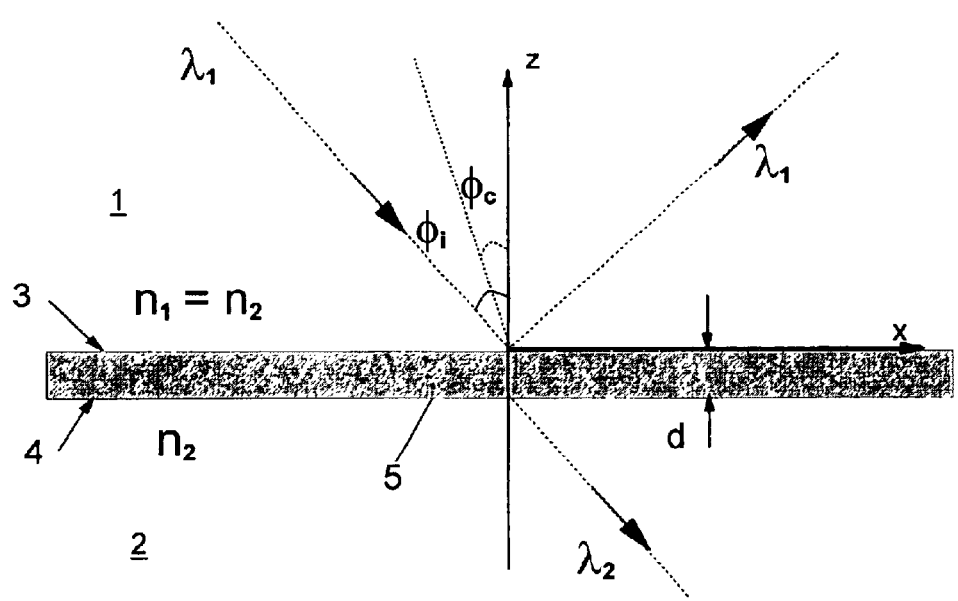
FIG. 1. Depicts basic total reflection and transmission at a semi infinite gap discontinuity.

FIG. 1 depicts basic total reflection and transmission at a semi infinite gap discontinuity. In FIG. 1, a non-absorbing medium 5 extends infinitely in the y direction (not shown), has thickness d in the z direction, index of refraction $n_3<n_2$, and forms a boundary 3 with medium 1 and boundary 4 with medium 2. In addition, the condition of $n_1=n_2$ is imposed. Then, under conditions of total reflection, that is, $\phi i>\phi c$, when d>>L all of the EM energy incident on boundary 3 from medium 1 is totally reflected back into medium 1 as discussed above. However, when d<L, a portion of the energy in medium 1 incident on boundary 3 is transmitted into medium 2 and the remainder is reflected back into medium 1. As d decreases, the fraction of light transmitted into medium 2, or tunneling across the gap d comprised of medium 5, increases and the fraction of light reflected back into medium 1 decreases. When d=0 all EM energy is transmitted into medium 2 as no discontinuity of the index of refraction in the medium of propagation exists. The characterizes of electromagnetic radiation and reflections are not identical for TE and TM polarization. However, if needed the two polarizations can be transformed into one another.

The physical phenomenon described above forms the basis for the evanescent wave tunneling optical switch of this invention which can be used to transfer light from a first waveguide to a second waveguide with very high efficiency. The optimization of a number of parameters will render the present invention practicable.

From here forward, the tunneling medium, 5 in FIG. 1, is assumed to be essentially air and the tunneling gap d will be allowed to vary. A first parameter is the tunneling gap, $d_t$, for which high, over 99.5%, transmission of EM energy into the adjacent medium 2 is realized. Basically, $d_t$ is the maximum gap width when the optical switch is still considered to be closed based on pre-determined transmission efficiency figures, namely transmits light. A basic requirement is that $d_t$ not be impractically small. A second parameter is the throw of the switch, $d_{th}$, defined as $d_{th}=(d_r-d_t)$, where $d_r$ is the tunneling gap for which high, over 99.8%, reflection back into medium 1 is obtained. Basically $d_r$ is minimum size of the gap, based on pre-determined transmission efficiency figures, at which the optical switch can be considered open, namely when it does not transmit light by means of efficient reflection. The switch throw $d_{th}$ should not be too large. This is a basic requirement since $d_{th}$ is the distance by which, in various embodiments the gap has to be increased or decreased for obtaining a switch like on/off behavior for the transmitted and reflected light. A third parameter is the range of angles of incidence, $\Delta\phi i$, in medium 1, for which high, over 99.8%, reflectivity back into medium 1 occurs when the tunneling gap is $d_r$. The range of angles (of incidence in medium 1), $\Delta\phi i$, for which this is the case, should extend from angles that are somewhat less than 45° to angles greater than 45°. A fourth parameter is the range of angles of incidence, in medium 1, for which high, over 99.5%, transmissivity into medium 2 occurs when the gap is $d_t$. The range of angles, of incidence in medium 1), $\Delta\phi i$, for which this is the case, should also extend from angles that are somewhat less than 45° to angles greater than 45°. Calculations of electromagnetic wave transmission and reflection properties of waveguides are well know in the art, [e.g. Takeshi Doi, et al., IEICE Trans. Electron, E80-C, 625 (1997) and C. Manolatou, et al., J. Lightwave Tech., 17, 1682 (1999)], and sufficiently accurate results for transmission and reflection at waveguide discontinuities can be obtained with infinite plane wave calculations.

The simplest approach to a transmission switch based on changing the gap 5 is shown in FIG. 1, as one embodiment. Calculations shown are for TM polarization in the case when the wavelength of the incident light $\lambda_0=1.5$ μm, $n_1=n_2=1.45$, $n_3=1.0$ ($\lambda_1=\lambda_0/n_1$, where $\lambda_0$ is the wavelength in vacuum) and the tunneling gap, d, assumes two values. For this case $d_t=70$ nm, and $d_r=2.5$ μm, giving a of $d_{th}=2.43$ μm. The behavior of the reflectivity is bidirectional, meaning it does not matter if light travels from medium 1 to medium 2, or the other way around.

Figure 2A:
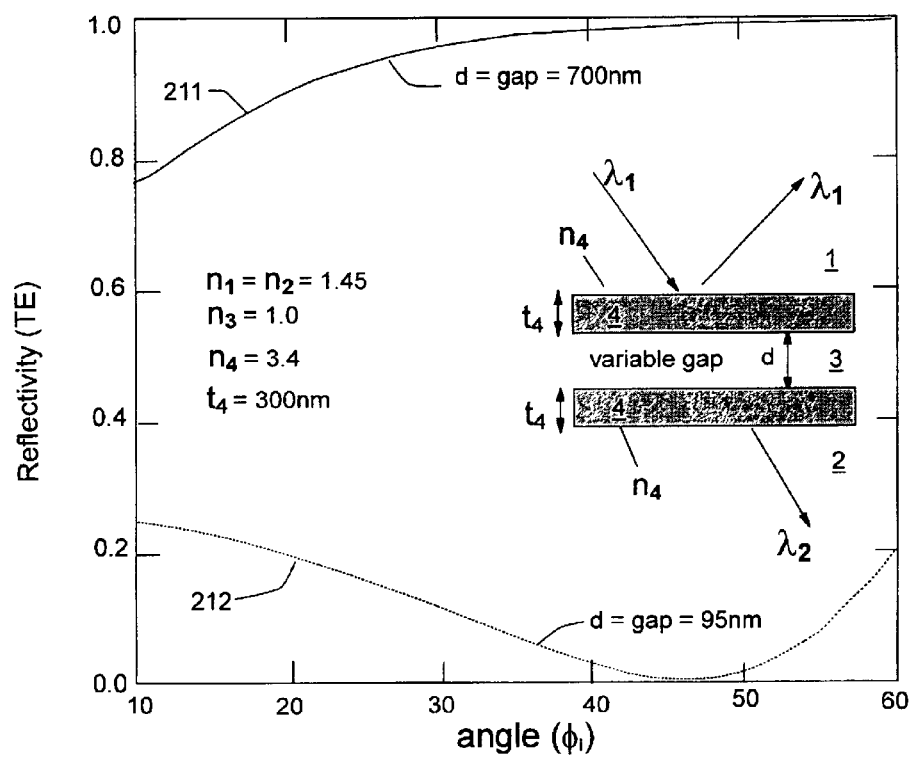
FIG. 2. Shows the calculated reflectivity at semi infinite gap discontinuities with tunneling gap engineering.
Figure 2B:
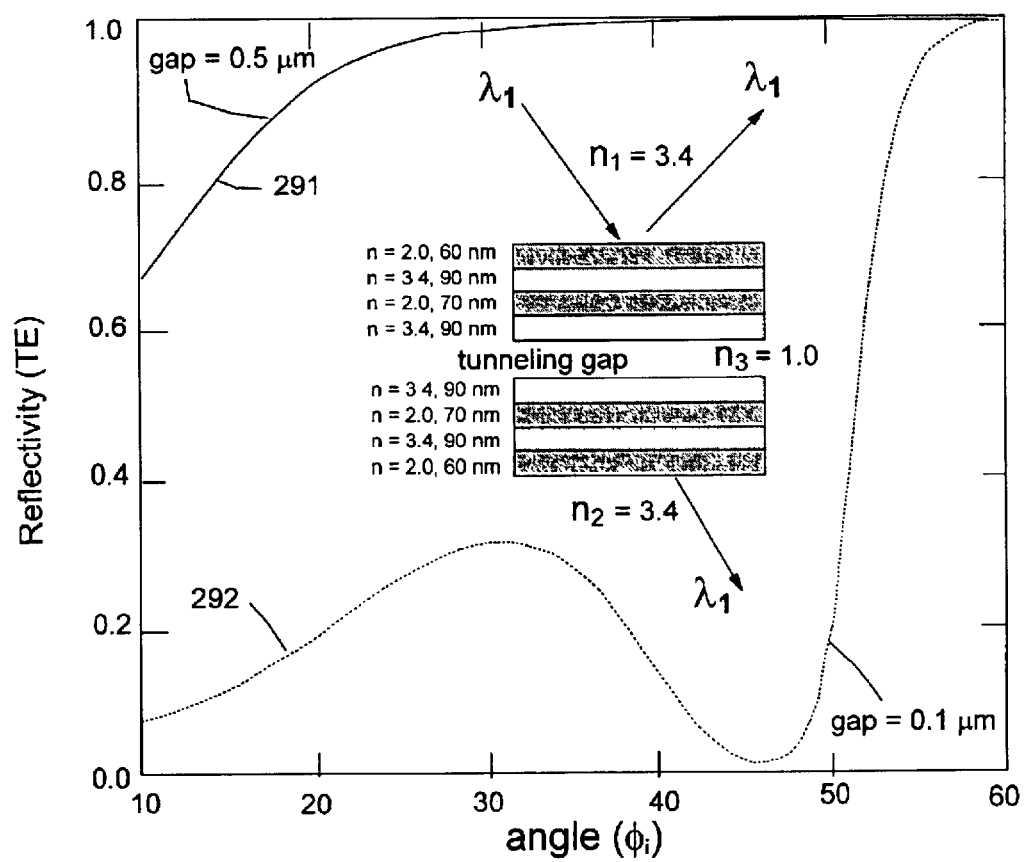

FIG. 2. shows the calculated reflectivity at a semi infinite gap discontinuities with tunneling gap engineering. FIGS. 2a and 2b show two different cases of such engineering. The switch throw, $d_{th}$, can be substantially reduced by tunneling gap engineering, a simple demonstration of which, is attained by symmetric coating with optical layers, as pair 4 shown in FIG. 2a, of suitable thickness $t_4$ and index of refraction $n_4$; one film is coated on semi-infinite medium 1 and one similar film is coated on semi-infinite medium 2. Each one of the film pair 4 occupies the space between each of the semi-infinite media and the gap medium 3 between them, as shown in FIG. 2a. The reflectivity for TE polarized light in an embodiment of the optical switch when the wavelength of the incident light $\lambda_0=1.5$ μm, $\lambda_1=\lambda_0/n_1$, $n_1=n_2=1.45$, $n_3=1.0$, $t_4=300$ nm, and $n_4=3.4$, substantially equivalent to the real part of the index of refraction of Silicon. It is seen in FIG. 2a that when $d_r=700$ nm the TE reflectivity is substantially high for $\phi i>40°$ curve 211, and that the transmissivity is substantially high for $40°<\phi i<50°$ when $d_t=95$ nm, curve 212. By the addition of film pair 4, the switch throw has been reduced to $d_{th}=605$ nm from its value of 2.43 μm in the absence of film pair 4. In the present embodiment, both $d_r$ and $d_{th}$ are considerably less than without tunneling gap engineering, and well within the range of piezo-electric or electro-static actuation. The behavior of the reflectivity is bidirectional, meaning it does not matter if light travels from medium 1 to medium 2, or the other way around.

A further example of tunneling gap engineering shown on FIG. 2b, a twin, mirror image of identical sandwich structures of four thin, non absorbing films, is used each with appropriately chosen thickness and index of refraction, in order to cause efficient transmission of EM radiation between two semi infinite media having high indices of refraction, across a substantially large air gap. Using the earlier nomenclature established above, when $\lambda_0=1.5$ μm, $\lambda_1=\lambda_0/n_1$, $n_1=n_2=3.4$, and $n_3=1.0$, and 4 thin films on each side of the gap, being mirror images of each other across the gap, with following parameters, in the order starting with the one coating materials 1 or 2; 1: thickness: 60 nm, index of refraction: 2.0; 2: thickness: 90 nm, index of refraction: 3.4; 3: thickness: 70 nm, index of refraction: 2.0; 4: thickness: 90 nm, index of refraction: 3.4. This arrangement gives $d_r=500$ nm, $d_t=100$ nm, and $d_{th}=400$ nm for TE polarization as shown by curves 291 and 292. The behavior of the reflectivity is bidirectional, meaning it does not matter if light travels from medium 1 to medium 2, or the other way around.

Clearly, as one skilled in the art would recognize, there are other possibilities of tunneling gap engineering with different choices in the number of non-absorbing optical films, and their thickness and index or refraction. The mirror symmetry of the thin film stack across the tunneling gap is not essential but desirable from the point of view of construction.

It has been shown that with appropriate evanescent wave gap engineering, it is possible to have the throw of the switch to be between 400 nm and 900 nm. This indicates that switch actuation can be attained by electrostatic or piezo electric means using cantilevers of small dimensions suitable for large scale integration of active optical switching elements as in large scale integration.

Waveguides discussed in the course of the description of the present invention are assumed to be ridge waveguides with a core of high index of refraction and to have no cladding, except for the coating of optical layers in the coupling regions. Such ridge waveguides have a rectangular cross section with top/bottom surfaces and side surfaces. All surfaces that are not top/bottom are hereon referred to as side surfaces including those that are not parallel with the direction of light propagation. These waveguide-to-waveguide energy exchange, or coupling, regions are spans of side surfaces facing one another across a gap.

It is well known to those skilled in the art of optics that one means of exchanging optical energy from a first waveguide to a second waveguide, without contact, is to bring the two waveguides, having sufficiently smooth and flat facets, into sufficient proximity to one another in order to facilitate exchange of EM energy by means of evanescent wave coupling. Indeed many commercially available optical couplers and splitters are based on this principle and are designed to operate with a fixed and stable tunneling gap. On the other hand, an optical switch based on evanescent wave coupling, having a variable and controlled tunneling gap is the subject matter of the present invention.

Figure 3:
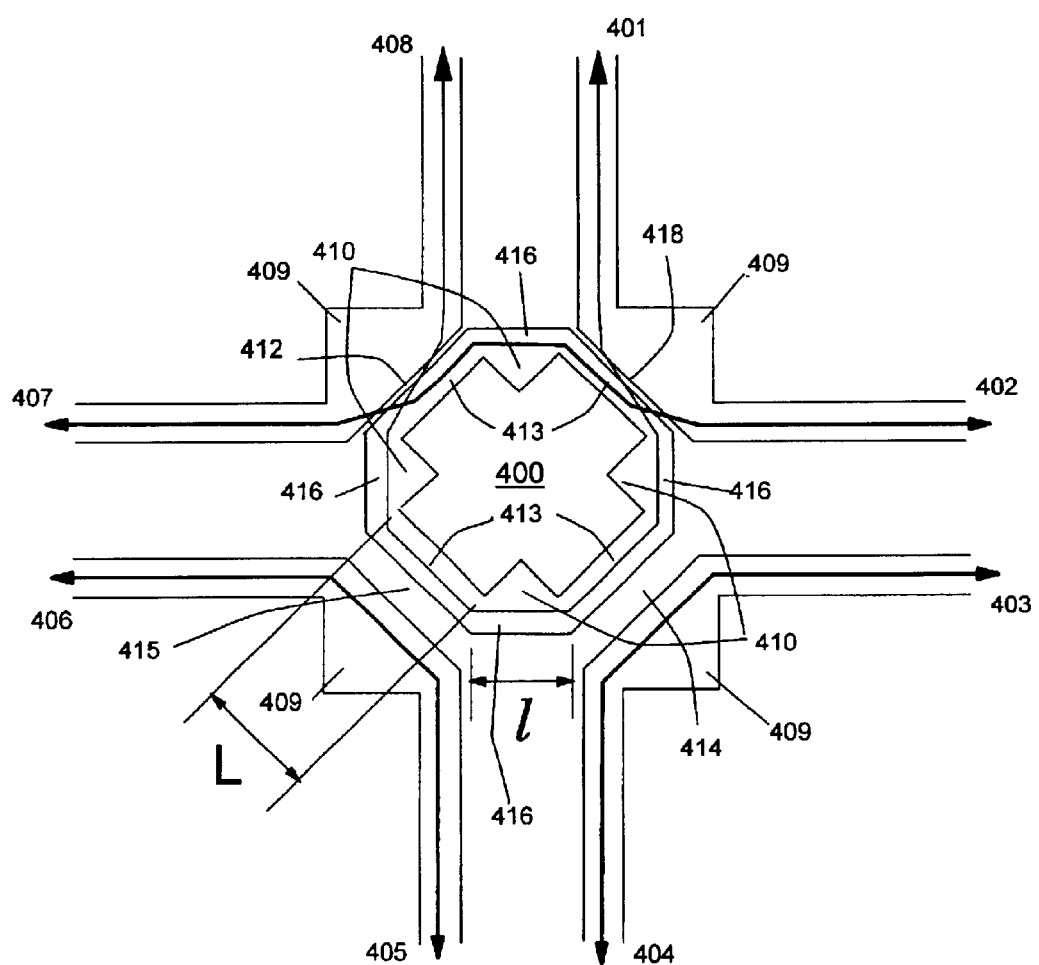
FIG. 3. Shows an optical switching node based on an optical circulator loop waveguide.

FIG. 3 shows an optical switching node based on an optical circulator loop waveguide, a preferred embodiment of the present invention. An optical circulator 400, which consists of a ridge waveguide in the form of a closed loop has sufficiently flat side facets and a sufficiently high index of refraction is moved in simultaneous proximity to any two adjacent waveguide segments 409 that form the energy exchange region of a waveguide network. In this manner, optical circulator 400 permits EM wave energy to be transferred from a first waveguide to a second waveguide by means of evanescent wave tunneling, as we now describe in more detail.

The optical circulator has plural wave guide regions 413 of length L and plural turning regions 416 of length l. L can be several times $\lambda_0$ and l can be a few times $\lambda_0$, where $\lambda_0$ is the wavelength in vacuum of the light that is propagating along any of the waveguides 401–408 in FIG. 3. When a side surface span of the optical circulator waveguide is brought into simultaneous proximity of side surface spans of the two ridge waveguides, having similarly flat side surface facets and similarly high refractive index, optical energy may couple, by means of evanescent wave tunneling, from the incident waveguide to the optical circulator 400, and from the optical circulator 400 into the exit waveguide. The evanescent wave tunneling is made more efficient with the above described of tunneling gap engineering; depositing appropriate optical layers on those side surface spans of the waveguides which face one another across the tunneling gap. In particular, referring to FIG. 3, the optical circulator is positioned such that it forms a narrow tunneling gap 412 between itself and waveguide 407–408 and simultaneously also forms a narrow tunneling gap 418 between itself and waveguide 401–402. In this case, the optical circulator is coupling waveguide 407–408 with waveguide 401–402. In this position the optical circulator also forms a wide separation 415 between itself and waveguide 405–406 and simultaneously forms a wide separation 414 between itself and waveguide 403–404. In this case, the optical circulator is de-coupling waveguide 405–406 form waveguide 403–404. In FIG. 3, light traveling from left to right along waveguide 407 tunnels into the optical circulator 400 across narrow gap 412, travels along the optical circulator waveguide structure, which includes one turn region 416, and tunnels out of the optical circulator 400 across narrow gap 418 and continues to travel from left to right along waveguide 402. In this case, light having substantially one wavelength is re-directed from waveguide 407 to waveguide 402. The coupling is bi-directional, and light having a slightly different wavelength can be exchanged from waveguide 402 to waveguide 407 in exactly the same manner and at the same time. Simultaneously, light traveling from up to down along waveguide 408 can also tunnel into the optical circulator 400 across narrow gap 412, travel along the optical circulator waveguide structure, which includes three turn regions 416, and tunnel out of the optical circulator 400 across narrow gap 418 and continue to travel from down to up along waveguide 401. In this case, light of substantially one wavelength, is re-directed from waveguide 408 to waveguide 401. The coupling is bi-directional, and light having a different wavelength can be exchanged form waveguide 401 to waveguide 408 in exactly the same manner and at the same time. Optical signals propagating in waveguides 405–406 and in waveguides 403–404 are substantially not affected. Again referring to FIG. 3, structures 409 and 410 where a waveguide makes a 90° turn are meant to indicate that careful design considerations must be evaluated in order to minimize guided wave losses at turns having a small radius of curvature. Design solutions to this problem have been considered by others [C. Manolatou, et al. Journal of Lightwave Technology, Vol. 17, page 1682, (1999); and Takeshi Doi, IEICE, Transactions in Electronics, Vol. E80-C, page 625, (1997)]. Both of these publications address design issues in order to minimize optical losses when a waveguide makes a right angle turn or turns with small effective radius of curvature. Structures 409 and 410 are included only as a reminder that turning regions in waveguides have to be properly designed in order to minimize optical losses.

In this discussion related to FIG. 3 the descriptions of narrow, close gap, or wide spacer and others relating to distances of the tunneling interfaces on the waveguides and the movable loop waveguide are to be understood in light of the earlier discussions on tunneling gap engineering, wherein appropriate optical layers are deposited on those side surface spans of the waveguides which face one another across the tunneling gap. Typically transmitting gaps are between 80 nm to 120 nm and non-transmitting gaps, or separating spacers, are between 500 nm and 2.5 $\mu$m.

It is clear from the discussion above that the optical circulator 400 in FIG. 3 can be moved to any one of four possible positions in order to facilitate EM wave energy exchange between any two of four possible adjacent pairs of wave guides.

Figure 4:
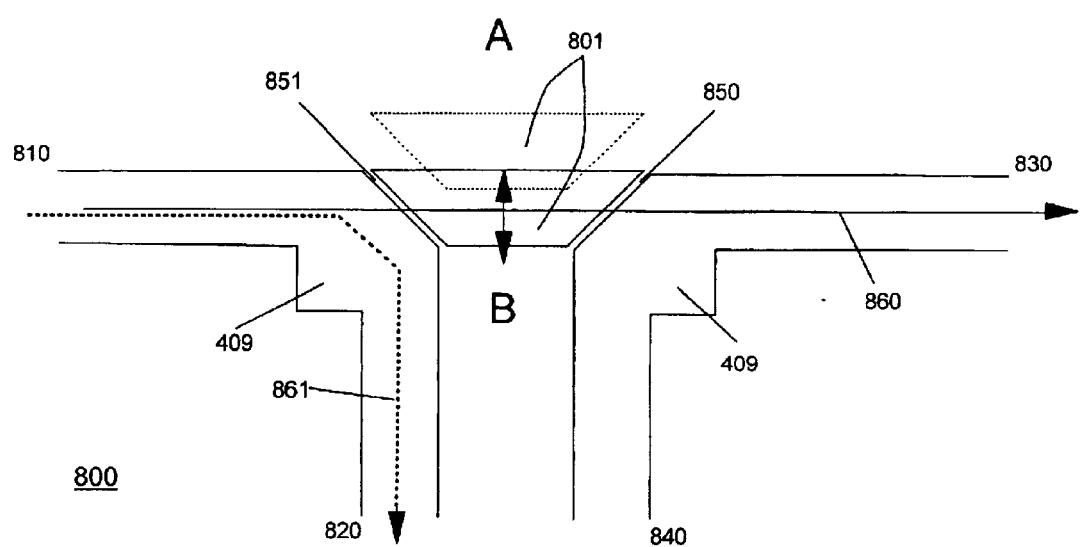
FIG. 4. Shows an optical switching node based on a waveguide segment.

Yet another embodiment of the invention is shown in FIG. 4, which shows an optical switching node based on a waveguide segment. The optical circulator 400 described in FIG. 3 is replaced by a single, movable waveguide segment 800. Waveguide segment 800 couples, when closed, and decouples, when open, two separate waveguides, each of which makes a 90° turn at the variable gaps 850 and 851 with the segment 800. This optical switch is closed when the segment 800 is in close proximity to both waveguide segments (810–820) and (830–840), position B. In the closed position B, the tunneling gaps 850 and 851 are sufficiently small to allow efficient evanescent wave coupling from one waveguide to the next. The evanescent wave tunneling is made more efficient with the above described of tunneling gap engineering; depositing appropriate optical layers on those side surface spans of the waveguides which face one another across the tunneling gap. This optical switch is open (position A) when the segment 800 is sufficiently far removed from waveguide segments (810–820) and (830–840) so that the separations 850 and 851 are sufficiently wide to decouple segment 800 from segments 810–820 and segments 830–840. In the open position A, evanescent wave coupling from one waveguide to the next is not possible and all waveguide segments are decoupled from one another. Consider a guided light wave propagating in waveguide 810 toward waveguide 830 as shown by the solid arrow 860. When the optical switch is closed, efficient evanescent wave tunneling occurs at gaps 851 and 850 and substantially all the guided wave energy is transmitted from waveguide 810 to waveguide 830. On the other hand, if the optical switch is open, total reflection occurs at gap 851 and substantially all of the guided wave energy is re-directed into waveguide 820. As is the case with optical circulator 400, right angle turns of wave guides have to be designed carefully in order to minimize losses as discussed in connection with FIG. 3.

In the discussions related to FIG. 4 the descriptions of narrow, close gap, or wide spacer and others relating to distances of the tunneling interfaces on the waveguides and the waveguide segment are to be understood in light of the earlier discussions on tunneling gap engineering, wherein appropriate optical layers are deposited on those side surface spans of the waveguides which face one another across the tunneling gap. Typically transmitting gaps are between 80 nm to 120 nm and non-transmitting gaps, or separating spacers, are between 500 nm and 2.5 µm.

Figure 5:
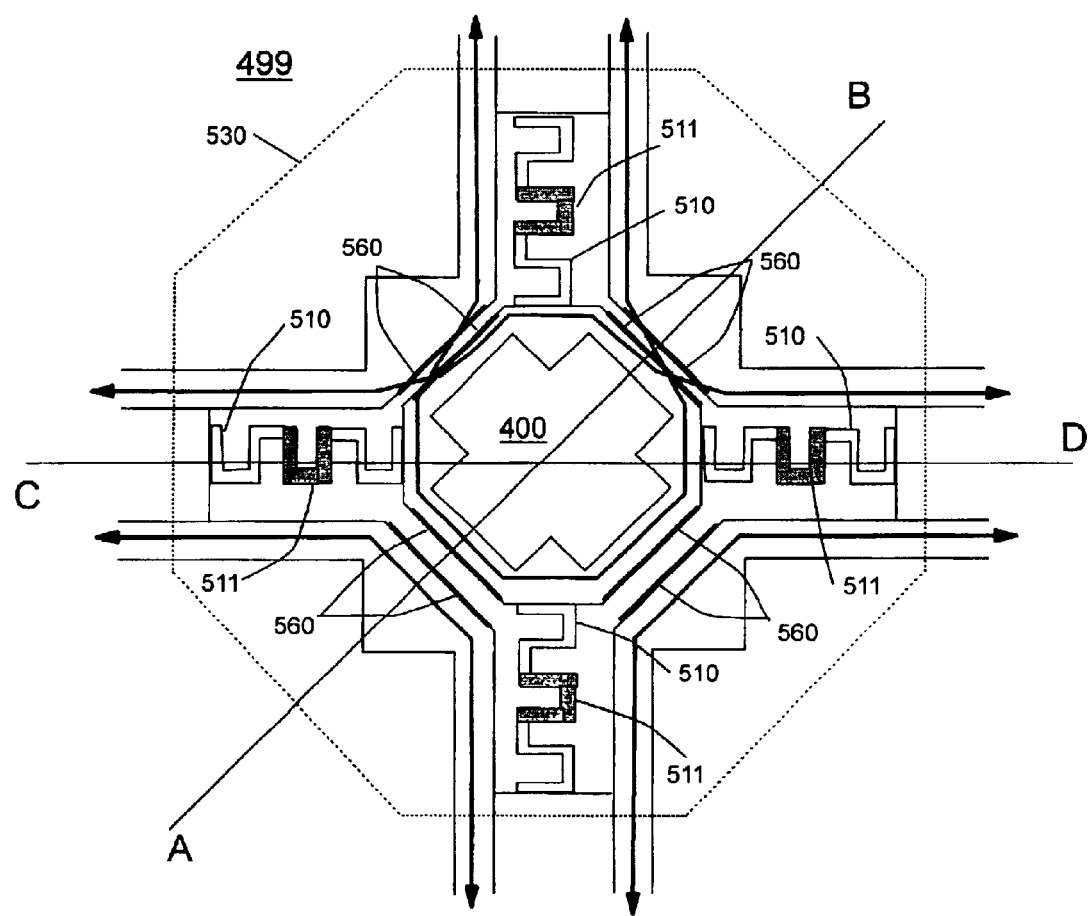
FIG. 5. Schematically shows a micro electro mechanical spring arrangement for actuating an optical switching node based on an optical circulator loop waveguide.

FIG. 5. Schematically shows a micro electro mechanical spring arrangement for actuating an optical switching node based on an optical circulator loop waveguide in a top view as a means for varying the tunneling gap in order to obtain an Evanescent Wave Tunneling optical switch. The electrostatic actuators of the present means for moving is based, in part, on the two-axis, micromachined Si actuator reported by [F Ayela, et al., Rev. Sci. Instrum., 71(5) 2211 (2000)]. The optical circulator substrate 400 is free to move. It is suspended by four springs 510 composed of a material or combination of materials chosen from the set ($Si3N_4$, W, Mo, $Al_2O_3$, Si or $SiO_2$). Each spring is joined at one end to the optical circulator substrate 400 at the other end across release layer gap 620 to the greater portion of the substrate 499 which supports the wave guide network discussed in conjunction with FIG. 3. The motion of the optical circulator against the combined restoring force to the four springs 510 is brought about by electrostatic forces applied in attraction or in repulsion or in tandem between each of four pairs of conducting surfaces 560 located vertically at each of the four positions 560 inside the trench 620 and below all waveguides. Two pairs of the conducting surfaces 560 are seen more clearly in the cross section view along line A–B shown in FIG. 6a. Referring again to FIG. 5, each of the four springs 510 is equipped with a piezo-resistive sensor 511 such as that described in (M. Tortonese, et al., Solid State Sensors and Actuators, Digest of Technical Papers, TRANSDUCERS'91, 1991 Intl. Conf. on, p. 448–451). The area enclosed by the dotted perimeter 530 represents the sub surface area dedicated to a release layer which, once removed, allows for the free motion of the optical circulator 400 and springs 510. When the release layer is removed, a cavity region 620 is formed, bounded by enclosure 530 and extending just under the optical circulator substrate 400 and springs 510 and allows for their free movement. The shown arrangement on FIG. 5 of the means for moving the movable loop waveguide by springs acting under control of electrostatic actuators is equally applicable for the movable waveguide segment shown on FIG. 4.

Figure 6A:
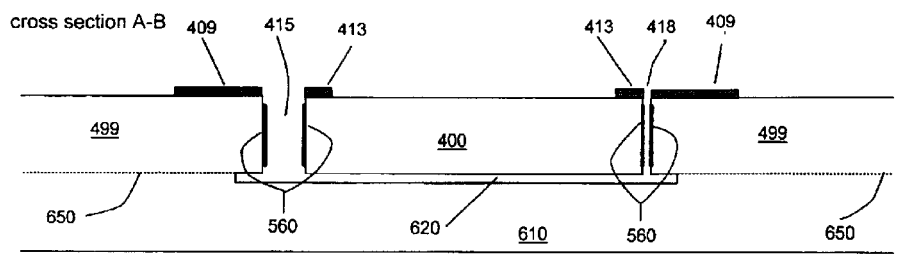
FIG. 6. Shows two cross sectional views of the spring arrangement of actuation shown in FIG. 5.
Figure 6B:
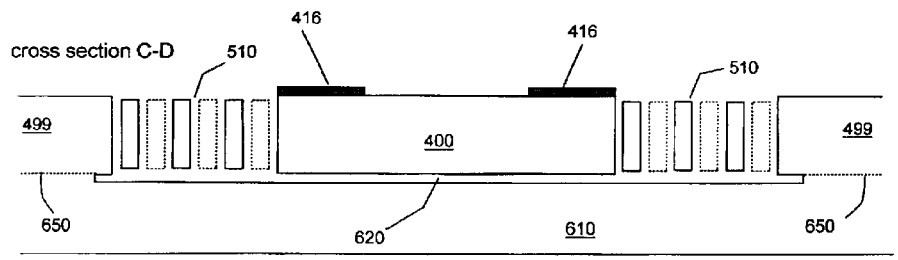

FIG. 6. Shows two cross sectional views of the spring arrangement of actuation shown in FIG. 5. In FIG. 6a is shown a cross section view along line A–B drawn in. FIG. 5 across the circulator 400 and neighboring wave guide structure. External waveguide segments 409 correspond to those of FIG. 3, as do circulator wave guide segments 413 and gaps 560. Adjacent pairs of conductive surfaces 560 are used to move the suspended optical circulator substrate 400 by means of electrostatic forces that act against restoring forces provided by springs 510. When the adjacent pairs of conductive surfaces 560 are equally charged, a repulsive driving force occurs and when the adjacent pairs of conductive surfaces 560 are oppositely charged, an attractive driving force occurs. When the release layer is removed, a cavity region 620 results, bounded by border 530. One fabrication process may require a step in which bonding between two wafers is desired. In one such process leading to the structures represented in FIGS. 5, 6a and 6b, the dotted lines 650 in FIGS. 6a and 6b represent surfaces of bonding between a substrate handler wafer 610 and a top layer wafer 499 on which the optical circulator 400 and waveguide network containing wave guide 409,413,401–408, et cetera, are fabricated.

In FIG. 6b is shown a cross section view along line C–D drawn in FIG. 5. The optical circulator waveguide segments 416 are shown as are the restoring springs 510 (which also serve to suspend and support the optical circulator substrate 400 above cavity 620). In the spring structure 510 shown in FIG. 6b, those spring segments represented by dotted lines denote those segments along cross section CD that are farther away from the viewer, while those spring segments represented by solid lines denote those segments along cross section CD that are closest to the viewer.

Figure 7:
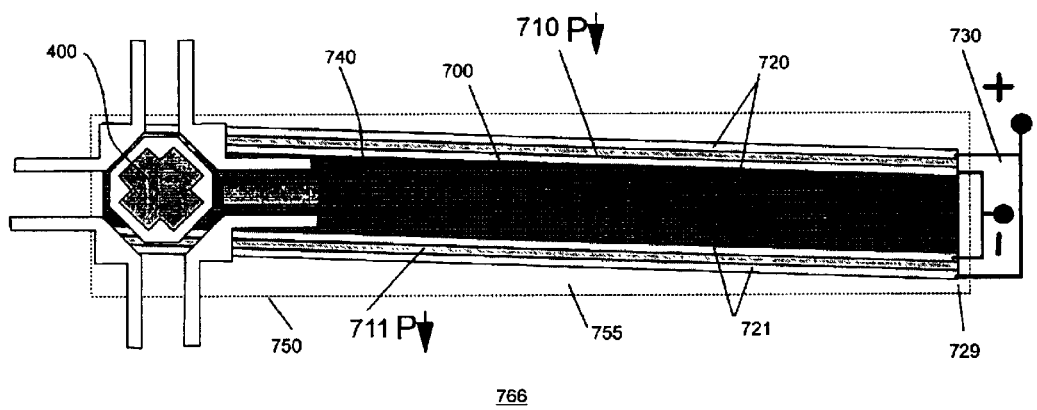
FIG. 7. Schematically shows a horizontal cantilever arrangement for actuating an optical switching node based on an optical circulator loop waveguide.

FIG. 7 schematically shows a horizontal cantilever arrangement for actuating an optical switching node based on an optical circulator loop waveguide in a top view as a means for varying the tunneling gap in order to obtain Evanescent Wave Tunneling switch action. In this case, a cantilever 700 has a first end anchored to substrate carrier 766 at position 729.The opposite end of the cantilever 700 is left free to move and is used to position the optical circulator 400. The cantilever 700 is composed of a suitable material chosen from the set ($Si3N_4$, W, Mo, $Al_2O_3$, Si or $SiO_2$). Two piezoelectric films, 710 and 711, with electrical contacts 720 and 721 are constructed on opposite vertical sides of the cantilever 700, as shown in FIG. 7. When correctly poled and activated the piezoelectric films 710 and 711 act as a bimorph piezoelectric thin film stack, well known to those skilled in the art of piezoelectric actuation, and cause the free end of cantilever 700 to move in the plane of the drawing. Each of the piezoelectric films 710 and 711 and electrical contacts 720 and 721 are constructed by means that are well know to those skilled in the art of thin film growth; see, for example [Paul Muralt, IEEE Trans. on Ultrasonics and Frequency Control, 47 (4), 903 (2000)]. Each of the piezoelectric films 710 and 711 are poled or polarized in the same direction as indicated by the P↓ symbol. Electrical circuit 730 connects the two piezoelectric films in the series bimorph configuration, well known to those skilled in the art of piezoelectric actuation. When activated, electrical circuit 730 causes one piezo film to contract and the other to expand, thus causing bending of the cantilever 700 and a displacement at the un-anchored end, and movement of the optical circulator 400. A piezoresistive sensor 740, such as that described for cantilever application in atomic force microscopy by [Reiner Jumpertz, "Entwicklung und Anwendung piezoresistiver Brückenelemente als integrierte Sensoren fir die Rasterkraftmikroskopie" Institut für Schicht—und Ionentechnik, Forschungszentrum Jülich, Deutschland, 1997. ISSN 0944-2952] is used as input in a feedback control loop and assures correct and precise positioning of the optical circulator 400. The cantilever 700 is free to move inside a subsurface trench 755 in substrate carrier 766 and outlined by dotted line 750. The shown arrangement on FIG. 7 of the means for moving the movable loop waveguide by a horizontal cantilever under control of piezoelectric actuators is equally applicable for the movable waveguide segment shown on FIG. 4.

Figure 8:
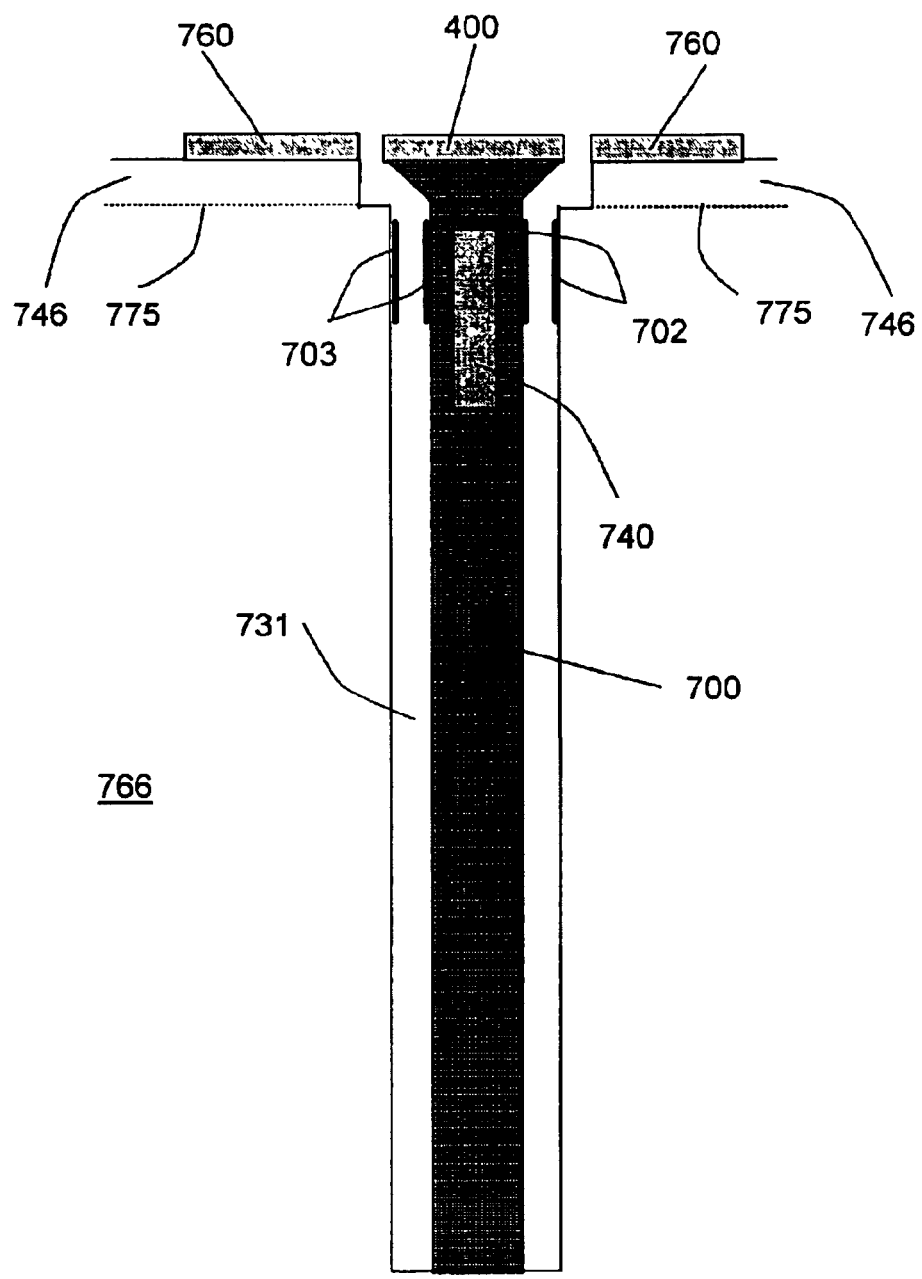
FIG. 8. Schematically shows a vertical cantilever arrangement for actuating an optical switching node.

FIG. 8. Schematically shows a vertical cantilever arrangement for actuating an optical switching node is shown in cross sectional view, as a further means for varying the tunneling gap in order to obtain Evanescent Wave Tunneling switch. This vertical arrangement is constructed in a cavity 731 that is constructed within a substrate carrier 766. In FIG. 8, cantilever actuation is affected electrostatically by pairs of electrodes such as those indicated by 702 and 703. Cantilever actuation could also be affected by series bimorph piezoelectric thin films as 710 and 711, and electrical circuit 730. The shown arrangement on FIG. 8 of the means for moving the movable loop waveguide by a vertical cantilever under control of piezoelectric actuators is equally applicable for the movable waveguide segment shown on FIG. 4.

One skilled in the art of microelectromechanical systems would notice that each of the presented means for moving the movable waveguides is applicable to either the waveguide segment embodiment, or the loop waveguide embodiment. In operation these means apply a linear displacement on the movable waveguide segments. This linear displacement separates the first position and the second position of the movable waveguides. In the first position where the optical switch is closed, the movable waveguides are interposed between the two waveguides and gaps separates the two waveguides from the movable waveguides, and light is transmitted between the two waveguides. In the second position where the optical switch is open, the movable waveguides are retracted from the two waveguides and no meaningful transmission of light occurs between the two waveguides. If the side surface spans of the two waveguides and of the movable waveguides where the evanescent wave coupling, or tunneling. occurs, are at approximately 45° angle with respect to the direction of the linear displacements that the various moving means produce, the size of the linear displacements are approximately $(2)^{0.5}$ (square-root of two) times larger than the size difference between the tunneling gaps and the retracted (second) position distances between the waveguides and the movable waveguides. In various other possible embodiments the angle of the surface spans of the two waveguides and of the movable waveguides with respect to the direction of the linear displacements that the various moving means produce maybe such that the linear displacement closely equals the size difference between the tunneling gaps and the retracted (second) position distances between the waveguides and the movable waveguides.

Figure 9:
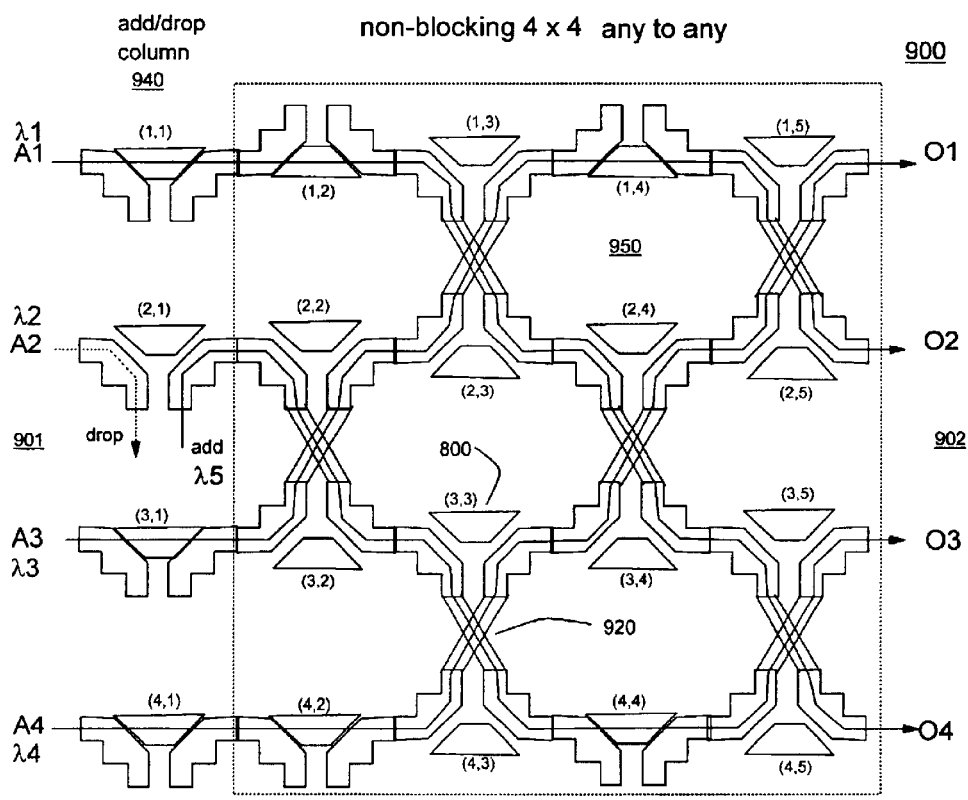
FIG. 9. Shows an example for construction of an N×N optical router using an array of evanescent wave optical switching nodes.

FIG. 9 shows an example for construction of an N×N optical router using an array of evanescent wave optical switching nodes, with an actual embodiment of a 4×4 optical router 900 contained within the dash-line rectangle. The basic components of router 900 are (1) the active switching element 800 described in FIG. 4, (2) bank 901 containing incoming signal ports A1 . . . A4, (3) bank 902 containing outgoing signal ports O1 . . . O4, (4) 4×4 optical switch bank 950 to selectively direct an incoming signal from any input port A1–A4 to any output port O1–O4, (5) waveguide crossing structure 920 and (6) dedicated ADD/DROP column 940 outside the dash-line rectangle. During operation, each optical signal having wavelength λj and arriving at incoming port Aj can be directed to any one of the outgoing ports Oj by the operation of optical switch bank 950. For the purpose of clarity in describing the routing and ADD/DROP operations, each switching node in bank 950 is labeled in accordance with conventional matrix notation. In order to route any incoming optical signal λj at port Aj in bank 901 to any outgoing port Oj in output bank 902, a degree of waveguide crossing one over the other is unavoidable. A solution to this problem is the waveguide crossing structure 920 to be described in FIG. 11. An example of the operation of the 4×4 optical router switch 900 is described as follows: incoming signal λ3 from port A3 in bank 901 is routed to outgoing port O2 when switches (3,1) and (1,4) in bank 950 are closed and switches (3,2), (2,2), (2,3), (1,3), (1,5), (2,5) are open. Switching nodes in the first column (N,1) are dedicated to ADD/DROP functions. For example, incoming signal λ2 from port A2 (dotted line) is dropped from the switch bank 950 at switching node (2,1) while signal λ5 is added at (2,1).

The network of this 4×4 embodiment, with dedicated ADD/DROP column, is an example of networks having M input ports and N output ports and being capable of directing light from any one of the M input ports to any one of the N output ports. With the type of switches disclosed in this invention typically such networks have 2NM vertices. A vertex is any point in the network where light can be directed in or out of a simple waveguide. The optical switches are all located at vertex points in the network, but not all vertices necessarily have to have optical switches. In the example of FIG. 9, in all 32 vertices of the network 950 have optical switches.

Figure 10:
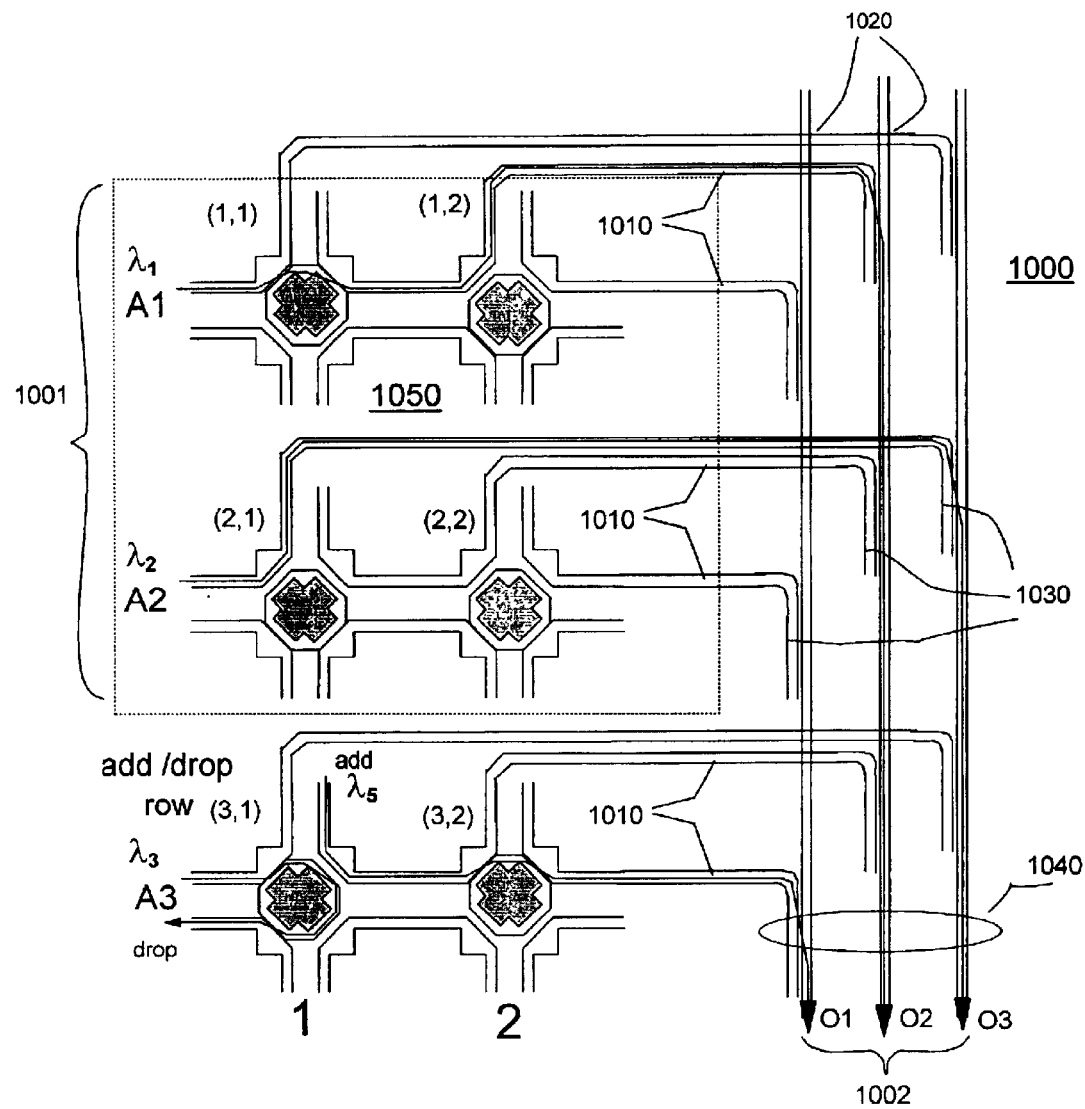
FIG. 10. Shows a second example for construction of an N×N optical router using an array of evanescent wave optical switching nodes.

FIG. 10 shows a second example for construction of an N×N optical router using an array of evanescent wave optical switching nodes, in a 2×2 embodiment 1000. The basic components of this router are (1) active switching element 400 described in FIG. 3, (2) bank 1001 of incoming signal port A2, (3) optical switch bank 1050, contained within the dash line rectangle, (4) dedicated row (in this example, row number 3) for ADD/DROP functions, (5) waveguide fabric 1010, (6) waveguide crossing structure 1020 and (7) waveguide merging structures 1030 and (8) outgoing optical waveguide fabric 1040, carrying outgoing signal to bank 1002 of outgoing ports O1 . . . O3. The waveguide crossing can be accomplished as will be shown in FIG. 11. The waveguide merging can be accomplished by means well known to those skilled in the art of optics, waveguides, splitters and optical communication. [See, for example, "Fundamentals of Optical Waveguides", by Katsunari Okamoto, NTT Photonics Laboratories, Chapter 7 (Academic Press, New York, 2000)]. During operation, each optical signal λj from incoming port Aj can be directed to any one of the outgoing ports Oj by the operation of the optical switch bank 1050 which re-directs the incoming signal λj to any outgoing port Oj via the fan-out waveguide fabric 1010, waveguide crossing scheme 1020 and waveguide merging scheme 1030 with outgoing waveguides 1040. As an example of the routing function, incoming signal λ1 from incoming port A1 in bank 1001 is routed to outgoing port O2 in bank 1002 by moving the optical circulator 400 at node (1,1) to the upper position, and the optical circulator 400 at node (1,2) to the lower or right position, as shown in FIG. 10. ADD/DROP functions are performed by row umber 3. For example, when optical circulator 400 at node (2,1) is in the left position, signal λ3 from incoming port A3 is directed outside the waveguide fabric 1010 and is dropped. Simultaneously, signal λ5 is introduced into the network via the available waveguide at node (3,1), and is sent to outgoing port O1 when optical circulator 400 at node (3,2) is in the upper position, as in FIG. 10. Alternatively, signal λ5 can be sent to outgoing port O2 by placing the optical circulator 400 at node (3,2) is in the lower or right position. In this embodiment not all vertices of network have optical switches located on them because merge techniques are used in vertices before the output ports.

Figure 11:
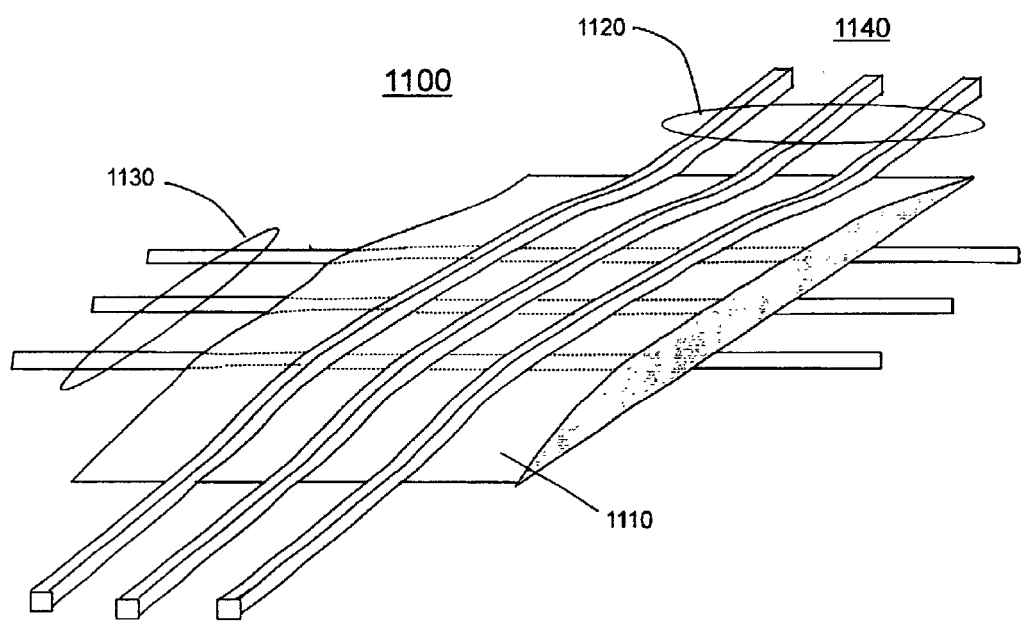
FIG. 11. Schematically shows a ramp-based arrangement for waveguide crossing.

FIG. 11 schematically shows a ramp-based arrangement for waveguide crossing. Because waveguide intersections tend to be lossy, waveguide crossing is best achieved by a sloping ramp overpass method 1100 shown in FIG. 11. A set of waveguides 1130 are formed on a surface 1140. An overpass ramp 1100 is constructed from an optically inert material having a low dielectric constant and low optical absorption, such as $SiO_2$, according to means known typically in the art of silicon processing. A second set of crossing waveguides 1120 is then constructed over surface 1140 and ramp surface 1110. Uniform feature definition over a non-flat surface topography can be obtained by low N.A. optics with long depth of focus or with highly collimated illumination as can be obtained by spatially filtering and expanding a beam of light from a source of appropriate wavelength. Since waveguide feature size is of the order of a few microns, and the ramp height is also of the order of a few microns, low NA optical lithography with relatively long depth of focus is appropriate. The gently sloping away nature of the two sided ramp over the section 1130 of the first set of waveguides, can be obtained by Chemical Mechanical Planarization and assures that in both in the first set 1130 and in the second set 1120 of waveguides light propagates undisturbed.

We have described and illustrated optical routers method for fabrication. While the present invention has been described in an illustrative manner, it should be understood that the terminology used is intended to be in a nature of words of description rather than of limitation.

Many modifications and variations of the present invention are possible in light of the above teachings, and could be apparent for those skilled in the art. The scope of the invention is defined by the appended claims.

We claim:

1. An optical switch for routing light between two waveguides, comprising:
   a movable waveguide, said movable waveguide having a first position and a second position, wherein in said first position said movable waveguide being interposed between said two waveguides and transmitting light between said two waveguides by evanescent wave coupling, and in said second position said movable waveguide retracted from said two waveguides and not transmitting light between said two waveguides;
   one or more optical layers coating a side surface span on said two waveguides and on said movable waveguide, wherein said coated side surface spans facing one another across gaps, wherein said gaps separate said movable waveguide from each of said two waveguides in said first position; and
   means for moving said movable waveguide between said first and second positions.

2. The optical switch of claim 1, wherein said two waveguides and said movable waveguide are ridge waveguides.

3. The optical switch of claim 1, wherein said optical switch is a bidirectional switch.

4. The optical switch of claim 1, wherein said one or more optical layers are forming identical sandwich structures on said two waveguides and on said movable waveguide, and said sandwich structures mirror one another across said gaps.

5. The optical switch of claim 1, wherein said gaps are between 50 nm and 100 nm.

6. The optical switch of claim 1, wherein in said second position a separation between said movable waveguide and at least one of said two waveguides is smaller than 2.6 µm.

7. The optical switch of claim 1, wherein said first position and said second position of said movable waveguide differ by a linear displacement.

8. The optical switch of claim 7, wherein said linear displacement is between 400 nm and 3.5 µm.

9. The optical switch of claim 8, wherein said linear displacement is between 400 nm and 900 nm.

10. The optical switch of claim 7, wherein said means for moving said movable waveguide comprise springs acting under control of electrostatic actuators.

11. The optical switch of claim 7, wherein said means for moving said movable waveguide comprise a cantilever under control of piezoelectric actuators.

12. The optical switch of claim 11, wherein said cantilever is aligned substantially in parallel to a plane containing said linear displacement.

13. The optical switch of claim 11, wherein said cantilever is aligned substantially in perpendicular to a plane containing said linear displacement.

14. The optical switch of claim 1, wherein said movable waveguide is a loop waveguide, said loop waveguide is capable of routing light propagating in either direction inside said two waveguides.

15. The optical switch of claim 1, wherein said movable waveguide is a single waveguide segment.

16. An optical routing network having M input ports and N output ports and being capable of directing light from any one of said M input ports to any one of said N output ports, comprising:
   a network of optical waveguides, said network having one or more vertices; and
   one or more optical switches for routing light between two waveguides, each of said one or more optical switch located at one of said one or more vertex of said network, wherein each of said one or more optical switch comprising a movable waveguide, said waveguide having a first position and a second position, wherein in said first position said movable waveguide being interposed between said two waveguides and transmitting light between said two waveguides by evanescent wave coupling, and in said second position said movable waveguide retracted from said two waveguides and not transmitting light between said two waveguides, and wherein each of said one or more optical switch further comprising means for moving said movable waveguide between said first and second positions, and one or more optical layers coating a side surface span on said two waveguides and on said movable waveguide, wherein said coated side surface spans facing one another across gaps, wherein said gaps separate said movable waveguide from each of said two waveguides in said first position.

17. The optical routing network of claim 16, wherein said network of optical waveguides and said movable waveguide are ridge waveguides.

18. The optical routing network of claim 16, wherein at least one of said one or more optical switches is a bidirectional switch.

19. The optical routing network of claim 16, wherein M=N, whereby said input ports equal in number said output ports.

20. The optical routing network of claim 16, wherein said movable waveguide is a loop waveguide, said loop waveguide is capable of routing light propagating in either direction inside said two waveguides.

21. The optical routing network of claim 16, wherein said movable waveguide is a single waveguide segment.

22. The optical routing network of claim 16, wherein said network further adapted to perform ADD/DROP operations, by inputting light at a momentarily unused one of said optical switches.

23. A method for routing light between two waveguides with an optical switch, comprising the steps of:
providing a movable waveguide;
moving said movable waveguide between a first position and a second position, wherein in said first position said movable waveguide is interposed between said two waveguides and transmits light between said two waveguides by evanescent wave coupling, and in said second position said movable waveguide is retracted from said two waveguides and does not transmit light between said two waveguides; and
coating a side surface span on said two waveguides and on said movable waveguide, wherein said coated side surface spans facing one another across gaps, wherein said gaps separate said movable waveguide from each of said two waveguides in said first position.

24. The method of claim 23, further comprising the step of choosing ridge waveguides for said two waveguides and said movable waveguide.

25. The method of claim 23, further comprising the step of operating said optical switch in a bidirectional manner.

26. The method of claim 23, further comprising the steps of forming with said one or more optical layers identical sandwich structures on said two waveguides and on said movable waveguide, and making said sandwich structures mirror one another across said gaps.

27. The method of claim 23, wherein said step of moving between said first position and said second position comprise the step of linearly displacing said movable waveguide.

28. The method of claim 27, comprising the step of linearly displacing said movable waveguide between 400 nm and 3.5 μm.

29. The method of claim 28, comprising the step of linearly displacing said movable waveguide between 400 nm and 900 m.

30. The method of claim 27, wherein the step of linearly displacing said movable waveguide is achieved by springs acting under control of electrostatic actuators.

31. The method of claim 27, wherein the step of linearly displacing said movable waveguide is achieved by a cantilever under control of piezoelectric actuators.

32. The method of claim 31, further comprising the step of aligning said cantilever substantially in parallel to a plane containing said linear displacement.

33. The method of claim 31, further comprising the step of aligning said cantilever substantially in perpendicular to a plane containing said linear displacement.

34. The method of claim 23, further comprising the step of selecting for said movable waveguide a loop waveguide, said loop waveguide being capable of routing light propagating in either direction inside said two waveguides.

35. The method of claim 23, further comprising the step of selecting for said movable waveguide a single waveguide segment.

36. A method for directing light in an optical routing network having M input ports and N output ports from any one of said M input ports to any one of said N output ports, comprising the steps of:
providing a network of optical waveguides, said network having one or more vertices; and
using one or more optical switches for routing light between two waveguides, locating each of said one or more optical switch at one of said one or more vertex of said network, wherein each of said one or more optical switch comprising a movable waveguide, said waveguide having a first position and a second position, wherein in said first position said movable waveguide being interposed between said two waveguides and transmitting light between said two waveguides by evanescent wave coupling, and in said second position said movable waveguide retracted from said two waveguides and not transmitting light between said two waveguides, and wherein each of said one or more optical switch further comprising means for moving said movable waveguide between said first and second positions, and one or more optical layers coating a side surface span on said two waveguides and on said movable waveguide, wherein said coated side surface spans facing one another across gaps, wherein said gaps separate said movable waveguide from each of said two waveguides in said first position.

37. The method for directing light of claim 36, further comprising the step of choosing ridge waveguides for said network of optical waveguides and said movable waveguide.

38. The method for directing light of claim 36, further comprising the step of operating at least one of said one or more optical switches in a bidirectional manner.

39. The method for directing light of claim 36, further comprising the step of choosing M=N, whereby said input ports equal in number said output ports.

40. The method for directing light of claim 36, further comprising the step of selecting for said movable waveguide a loop waveguide, said loop waveguide being capable of routing light propagating in either direction inside said two waveguides.

41. The method for directing light of claim 36, further comprising the step of selecting for said movable waveguide a single waveguide segment.

42. The method for directing light of claim 36, further comprising the step of performing in said network ADD/DROP operations, by inputting light at a momentarily unused one of said optical switches.

43. An optical routing network having M input ports and N output ports and being capable of directing light from any one of said M input ports to any one of said N output ports, comprising;
a network of optical waveguides, said network having one or more vertices;
one or more optical switches for routing light between two waveguides, each of said one or more optical switch located at one of said one or more vertex of said network, wherein each of said one or more optical switch comprising a movable waveguide, said waveguide having a first position and a second position, wherein in said first position said movable waveguide being interposed between said two waveguides and transmitting light between said two waveguides by evanescent wave coupling, and in said second position said movable waveguide retracted from said two waveguides and not transmitting light between said two waveguides, and wherein each of said one or more optical switch further comprising means for moving said movable waveguide between said first and second positions; and a waveguide crossing structure for preventing light leakage between a first set of waveguides of said network end a second set of waveguides of said network, wherein each set containing one or more waveguides, and wherein waveguides of each set being parallel with one another, and said first set of waveguides crossing path with said second set of waveguides, wherein said crossing structure comprising an optically inert material deposited over a section of said first set of waveguides, said material forming a two sided ramp over said section with said ramps sloping away from said section, and said second set of waveguides laid over said optically inert material with said sloping ramps, whereby in said first and second set of waveguides light propagates undisturbed.

44. A method for directing light in an optical routing network having M input ports and N output ports from any one of said M input ports to any one of said N output ports, comprising the steps of:

providing a network of optical waveguides, said network having one or more vertices;

using one or more optical switches for routing light between two waveguides, locating each of said one or more optical switch at one of said one or more vertex of said network, wherein each of said one or more optical switch comprising a movable waveguide, said waveguide having a first position and a second position, wherein in said first position said movable waveguide being interposed between said two waveguides and transmitting light between said two waveguides evanescent wave coupling, and in said second position said movable waveguide retracted from said two waveguides and not transmitting light between said two waveguides, and wherein each of said one or more optical switch further comprising means for moving said movable waveguide between said first and second positions; and fabricating a waveguide crossing structure for preventing light leakage between a first set of waveguides of said network and a second set of waveguides of said network, wherein each set containing one or more waveguides, and wherein waveguides of each set being parallel with one another, and said first set of waveguides crossing path with said second set of waveguides, wherein said crossing structure comprising an optically inert material deposited over a section of said first set of waveguides, said material forming a two sided ramp over said section with maid ramps sloping away from said section, and said second set of waveguides laid over said optically inert material with said sloping ramps, whereby in said first and second met of waveguides light propagates undisturbed.

* * * * *